United States Patent
Whittier et al.

(10) Patent No.: US 9,725,346 B2
(45) Date of Patent: Aug. 8, 2017

(54) DEVICES, SYSTEMS AND METHODS FOR FACILITATING NUTRIENT REMOVAL BY ANAEROBIC AMMONIA OXIDATION

(71) Applicant: Evoqua Water Technologies LLC, Warrendale, PA (US)

(72) Inventors: Michael Casey Whittier, Waukesha, WI (US); Timothy Lindemann, Jefferson, WI (US); Nathan Antonneau, Queen Creek, AZ (US)

(73) Assignee: Evoqua Water Technologies LLC, Warrendale, PA (US)

( * ) Notice: Subject to any disclaimer, the term of this patent is extended or adjusted under 35 U.S.C. 154(b) by 0 days.

(21) Appl. No.: 14/898,340

(22) PCT Filed: Jun. 17, 2014

(86) PCT No.: PCT/US2014/042810
§ 371 (c)(1),
(2) Date: Dec. 14, 2015

(87) PCT Pub. No.: WO2014/205005
PCT Pub. Date: Dec. 24, 2014

(65) Prior Publication Data
US 2016/0130164 A1    May 12, 2016

Related U.S. Application Data

(60) Provisional application No. 61/836,302, filed on Jun. 18, 2013, provisional application No. 61/926,452, (Continued)

(51) Int. Cl.
*C02F 3/30* (2006.01)

(52) U.S. Cl.
CPC ........ *C02F 3/307* (2013.01); *C02F 2203/004* (2013.01)

(58) Field of Classification Search
CPC ..................... C02F 3/307; C02F 2203/004
(Continued)

(56) References Cited

U.S. PATENT DOCUMENTS 5,078,884 A    1/1992   Mulder
5,811,009 A    9/1998   Kos
(Continued)

FOREIGN PATENT DOCUMENTS

CN        102145940 A       8/2011
WO    WO 2011/103286 A2  *  8/2011

OTHER PUBLICATIONS

International Search Report, corresponding PCT/US2014/042810, dated Oct. 8, 2014.

*Primary Examiner* — Fred Prince

(57) ABSTRACT

A system and method of treating wastewater having at least one undesirable biological species is provided. In accordance with embodiments, a wastewater treatment system is provided comprising a main biological treatment train including at least one first unit operation configured to perform an anaerobic ammonium oxidation process, and at least one subsystem configured to increase a concentration of anammox bacteria in the at least one first unit operation, the treatment system arranged to reduce the concentration of total nitrogen in the wastewater.

13 Claims, 3 Drawing Sheets

Related U.S. Application Data filed on Jan. 13, 2014, provisional application No. 61/868,802, filed on Aug. 22, 2013.

(58) Field of Classification Search
USPC ..... 210/605, 623, 630, 903, 195.3, 252, 259
See application file for complete search history.

(56) References Cited

U.S. PATENT DOCUMENTS

| | | |
|---|---|---|
| 6,485,646 B1 | 11/2002 | Dijkman et al. |
| 2011/0089105 A1 | 4/2011 | Liu et al. |
| 2012/0305477 A1 | 12/2012 | Stroot |
| 2013/0233792 A1* | 9/2013 | Brown, III .............. C02F 3/106 |
| | | 210/611 |

* cited by examiner

DEVICES, SYSTEMS AND METHODS FOR FACILITATING NUTRIENT REMOVAL BY ANAEROBIC AMMONIA OXIDATION

RELATED APPLICATIONS

This application claims priority to U.S. Provisional Application Ser. No. 61/836,302, titled "AERATED ANOXIC ANAMMOX," filed Jun. 18, 2013, U.S. Provisional Application Ser. No. 61/868,802, titled "ANAMMOX SELECTION USING DISSOLVED AIR FLOTATION AND ANAEROBIC DIGESTION RECYCLE," filed Aug. 22, 2013, and U.S. Provisional Application Ser. No. 61/926,452, titled "AERATED ANOXIC ANAMMOX SYSTEM AND METHOD," filed Jan. 13, 2014, which are hereby incorporated by reference in their entirety for all purposes.

BACKGROUND

This disclosure relates to the treatment of wastewater, and more specifically, to the treatment of wastewater using an aerated anoxic ammonia oxidation system.

SUMMARY

In accordance with an aspect of the present disclosure, a wastewater treatment system is provided. The wastewater treatment system comprises an inlet configured to receive influent wastewater having an initial concentration of total nitrogen, a main biological treatment train including at least one first unit operation configured to perform an anaerobic ammonium oxidation process in indirect fluid communication downstream of the inlet, and at least one subsystem configured to increase a concentration of anammox bacteria in the at least one first unit operation. The wastewater treatment system is configured to produce an effluent having a concentration of total nitrogen that is less than the initial concentration of total nitrogen.

In accordance with some embodiments, the at least one subsystem further comprises a bacteria selection device constructed and arranged to separate anammox bacteria from at least one second bacteria and a surface wasting device configured to waste the at least one second bacteria from the system.

In accordance with some embodiments, the bacteria selection device comprises a stratification column configured to stratify anammox bacteria from the at least one second bacteria.

In accordance with some embodiments, the stratification column is disposed in a biological treatment vessel of the main biological treatment train.

In accordance with some embodiments, the subsystem comprises a first separator configured to separate a mixed liquor produced in a contact tank having an inlet fluidly connected to a source of the wastewater into a solids-lean portion and a solids rich portion and to direct the solids-rich portion into an inlet of an anaerobic digester having a digested sludge outlet in fluid communication with an inlet of the main biological treatment train.

In accordance with some embodiments, the subsystem further comprises a conduit configured to recycle a portion of a digested sludge produced in the anaerobic digester back to an inlet of the contact tank.

In accordance with some embodiments, the system further comprises a first conduit configured to direct a first portion of a digested sludge produced in the anaerobic digester to an inlet of a first treatment vessel of the main biological treatment train which is upstream of all other treatment vessels in the main biological treatment train and a second conduit configured to direct a second portion of the digested sludge produced in the anaerobic digester to an inlet of a second treatment vessel of the main biological treatment train which is downstream of the first treatment vessel.

In accordance with some embodiments, at least one of the first treatment vessel and the second treatment vessel comprises an anoxic, aerated-anoxic, or anaerobic treatment vessel configured to perform the at least one first unit operation.

In accordance with some embodiments, the at least one subsystem further comprises a conduit configured to direct a portion of a digested sludge produced in the anaerobic digester to a side stream reactor configured to grow anammox bacteria at a rate greater than at least one other bacterial species.

In accordance with some embodiments, the system further includes a second conduit configured to direct a first portion of anammox bacteria grown in the side stream reactor into an inlet of the main biological treatment train.

In accordance with some embodiments, the system further includes a third conduit configured to direct a second portion of anammox bacteria grown in the side stream reactor into an inlet of the contact tank.

In accordance with another aspect of the present disclosure, a method of treating wastewater is provided, the method comprising directing the wastewater into a contact tank to produce a first mixed liquor, the wastewater having an initial concentration of nitrogen, directing the first mixed liquor into a first separation system to produce a solids-rich sludge and a solids-lean effluent, introducing the solids-lean effluent into a main biological treatment train containing anammox bacteria, increasing a concentration of anammox bacteria in the main biological treatment train utilizing at least one subsystem, treating the solids-lean effluent in the main biological treatment train to produce a second mixed liquor, and directing the second mixed liquor into a second separation system to produce a second solids-rich sludge and a second solids-lean effluent, the second solids-lean effluent having a concentration of total nitrogen that is less than the initial concentration of total nitrogen.

In accordance with some embodiments, the method further includes increasing a concentration of anammox bacteria in the main biological treatment train by separating anammox bacteria from at least one second bacteria in a bacteria selection device and wasting the at least one second bacteria from the main biological treatment train.

In accordance with some embodiments, the method further includes separating the anammox bacteria from the at least one second bacteria by stratifying the anammox bacteria from the at least one second bacteria in a stratification column disposed in a biological treatment vessel of the main biological treatment train.

In accordance with some embodiments, the method includes increasing a concentration of anammox bacteria in the main biological treatment train by anaerobically digesting the solids-rich sludge in an anaerobic digester to produce an anaerobically digested sludge and introducing a first portion of the anaerobically digested sludge into the main biological treatment train.

In accordance with some embodiments, the method further includes introducing the first portion of the anaerobically digested sludge into the main biological treatment train by introducing a first amount of the first portion of the anaerobically digested sludge into an inlet of a first treatment vessel of the main biological treatment train which is upstream of all other treatment vessels in the main biological treatment train and introducing a second amount of the first portion of the anaerobically digested sludge into an inlet of a second treatment vessel of the main biological treatment train which is downstream of the first treatment vessel.

In accordance with some embodiments, the method further comprises increasing the concentration of anammox bacteria in the aerated anoxic anammox biological treatment train by directing a second portion of the anaerobically digested sludge into a side stream reactor configured to grow anammox bacteria at a rate greater than at least one other bacterial species and introducing anammox bacteria from the side stream reactor into the main biological treatment train.

In accordance with some embodiments, the method further comprises introducing anammox bacteria from the side stream reactor into the contact tank.

In accordance with some embodiments, the method further comprises introducing a second portion of the anaerobically digested sludge into the contact tank.

In accordance with some embodiments, the method further comprises recycling a first portion of the second solids-rich sludge to the contact tank, and a second portion of the second solids-rich sludge to the main biological treatment train.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
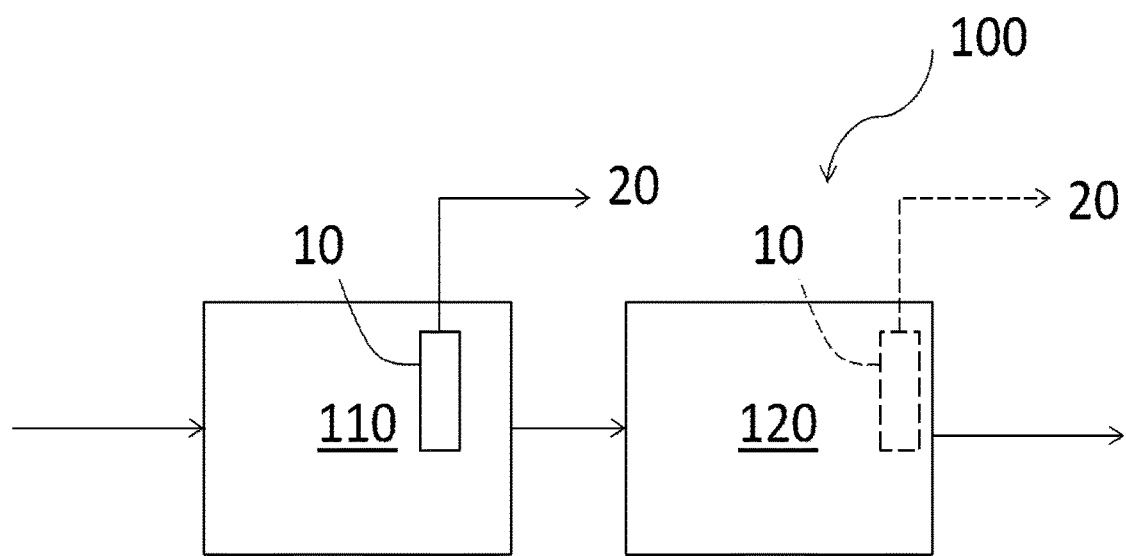
FIG. 1 is a diagram of a system comprising a bacteria selection device in accordance with some aspects and embodiments.

As used herein, the terms "water," "wastewater," and "wastewater stream" can refer to water to be treated such as streams or bodies of water from residential, commercial, municipal, industrial, or agricultural sources, as well as mixtures thereof, that typically contain at least one undesirable species, or pollutant, comprised of biodegradable, inorganic or organic, materials which can be decomposed or converted by biological processes into environmentally benign, or at least less objectionable, compounds. The water to be treated can also contain biological solids or inert materials. Aspects and embodiments of the present invention may be utilized for primary wastewater treatment, secondary wastewater treatment, or both. Aspects and embodiments of the present invention may remove sufficient contaminants from wastewater to produce product water that may be used for, for example, irrigation water, potable water, cooling water, boiler tank water, or for other purposes.

As the term is used herein, an "upstream" unit operation refers to a first unit operation which is performed upon a fluid undergoing treatment prior to a second unit operation. Similarly, an "upstream" treatment vessel or portion thereof refers to a first treatment vessel or portion thereof in which a first unit operation is performed prior to a second unit operation performed in a second treatment vessel or portion thereof. A "downstream" unit operation refers to a second unit operation which is performed upon a fluid undergoing treatment subsequent to a first unit operation. Similarly, a "downstream" treatment vessel or portion thereof refers to a second treatment vessel or portion thereof in which a second unit operation is performed subsequent to a first unit operation performed in a first treatment vessel or portion thereof. An upstream unit operation and/or treatment vessel having an outlet in "direct fluid communication" with an inlet of a downstream unit operation and/or treatment vessel directs material output from the outlet of the upstream unit operation and/or treatment vessel into the inlet of the downstream unit operation and/or treatment vessel without any intervening operations performed on the material. A first unit operation and/or treatment vessel described herein as being in fluid communication with a second unit operation and/or treatment vessel should be understood as being in direct fluid communication with the second unit operation and/or treatment vessel unless explicitly described as otherwise. Conduits which provide fluid communication between a first and a second unit operation and/or treatment vessel are to be understood as providing direct fluid communication between the first and second unit operation and/or treatment vessel unless explicitly described as otherwise.

A "solids-lean" or "sludge-lean" sludge, portion, stream, or fluid is typically a liquid, such as water that has been at least partially treated, having less suspended solids relative to a starting mixed liquor or sludge after one or more settling or separation operations. Conversely, a "solids-rich" or "sludge-rich" sludge, portion, stream, or fluid is typically a liquid, such as water that has been at least partially treated, having a higher solids concentration relative to the starting mixed liquor or sludge after one or more settling or separation operations. For example, a mixed liquor having suspended solids can be allowed to promote settling of at least a portion of the solids suspended therein; the resultant water body, as a consequence of artificially induced or natural gravitational forces will typically have a lower water layer and an upper water layer, wherein the lower layer has a higher concentration of solids, relative to the starting mixed liquor and to the upper, solids-lean water layer. Further, the solids-lean water layer will typically have a lower concentration of solids suspended therein relative to the starting mixed liquor. Separation operations that can be utilized to effect or promote some aspects of the invention can utilize gravitational forces produce any of the solids-rich, solids-lean, sludge-rich, and sludge-lean portions or streams. Other separation operations can involve filtration or flotation of solids.

One or more of the inventive systems disclosed herein can comprise one or more biologically-based or non-biologically-based unit operations. The systems and techniques of the invention can be effected as, or at least as a portion, of decontamination or treatment systems that typically include one or more of pre-treatment, primary treatment, secondary treatment, and post-treatment or polishing operations. The treatment facilities that can employ one or more aspects of the invention can include at least one of the pre-treatment, primary treatment, secondary treatment, and post-treatment or polishing operations.

Pretreatment systems and operations may remove grit, sand, and gravel. Primary treatment operations or systems can involve at least partial equalization, neutralization, and/or removal of large insoluble material of the water to be treated such as, but not limited to fats, oils, and grease. The pretreatment and primary treatment operations may be combined to remove such materials as well as settleable solids and floating bodies, and insoluble objects such as rags and sticks. For example, primary clarifiers may be utilized to separate solids.

Secondary treatment unit operations or systems can involve biological treatment such as those that typically employ a biomass with bacteria or a consortium of microorganisms to at least partially hydrolyze or convert biodegradable material such as, but not limited to sugar, fat, organic molecules, and compounds that create an oxygen demand in the water. Indeed, some advantageous aspects of the invention can utilize biological processes and systems to remove or convert at least a portion of organic material in the water to be treated.

Post-treatment or polishing operations or systems can include biological treatments, chemical treatments, and separation systems. The post-treatment operations may include processes that involve biological nitrification/denitrification and phosphorus removal. Chemical treatments that can be used may include chemical oxidation and chemical precipitation. Separation systems can include dissolved inorganic solids removal by ion exchange, ultrafiltration, reverse osmosis, or electrodialysis. Further treatment processes can involve disinfection, decontamination or inactivation of at least a portion of any residual microorganisms by chemical or physical means. For example, disinfection can be effected by exposure to any one or more of oxidizing agents or to actinic radiation. Commercially available separation systems that may be utilized in some embodiments of the invention include those employing the CMF-S™ continuous membrane filtration modules, modules having Forty-X™ disk filters, CoMag® systems, MemPulse™ Membrane Bioreactor systems, as well as the MEMCOR® CMF (Pressurized) XP, CP, and XS membrane filtration systems, from Evoqua Water Technologies LLC. Other separators that can be used include filter presses and centrifuges.

Some embodiments of the treatment systems disclosed herein may comprise a source of wastewater to be treated and a biological sorption tank (also referred to herein as a contact tank) having a sorption tank inlet fluidly connected to the source of the wastewater. Aspects and embodiments of the treatment systems disclosed herein may also comprise a first separator having a separator inlet fluidly connected downstream from the biological sorption tank, a sludge or solids-rich fluid outlet, and a solids-lean fluid outlet. Aspects and embodiments of the treatment systems disclosed herein may also comprise a second separator having a separator inlet fluidly connected to the source of wastewater, a sludge or solids-rich fluid outlet, and a solids-lean fluid outlet. Aspects and embodiments of the treatment systems disclosed herein may further comprise a main biological treatment train including one or more biological reactors. As the term is used herein, a "biological treatment train" or "train" refers to a biological treatment system including one or more biological reactors in fluid communication with one another. For example, a main biological treatment train may comprise any of an aerobic, anoxic, or anaerobic reactor, or combinations thereof. In accordance with embodiments, a main biological treatment train may include one or more anoxic and aerobic unit operations or treatment vessels directly or indirectly fluidly connected downstream from the biological sorption tank and/or separator. Aspects and embodiments of the treatment systems disclosed herein may additionally comprise an anaerobic digester having a digester inlet fluidly connected downstream of the solids-rich fluid outlets of one or both of the first separator and the second separator, and a digested sludge outlet fluidly connected upstream of the sorption tank inlet and fluidly connected to an inlet of the main biological treatment train.

Non-limiting examples of clarifiers or components thereof that can be utilized in one or more configurations of the present treatment systems include, but are not limited to the ENVIREX® FLOC-CLARIFIER system, the RIM-FLO® circular clarifier, and the TRANS-FLO® clarifier, from Evoqua Water Technologies LLC.

Non-limiting examples of components or portions of anaerobic systems that can be utilized in one or more configurations of the wastewater systems include, but are not limited to, the DYSTOR® digester gas holder system, the CROWN® disintegration system, the PEARTH® digester gas mixing system, the PFT® spiral guided digester gas holder, the PFT® vertical guided digester holder, the DUO-DECK™ floating digester cover, and the PFT® heater and heat exchanger system, from Evoqua Water Technologies LLC.

Wastewaters often contain high levels of biological nutrients that, when discharged into the environment, cause eutrophication. Eutrophication is the ecosystem's response to the presence of these excess nutrients. Wastewater, especially wastewater comprising human waste, generally contains high levels of biological nutrients such as nitrogen and phosphorous. When excess nitrogen and phosphorous are allowed to permeate into surface waters, eutrophication in the form of algal blooms, increased turbidity, low levels of dissolved oxygen, hypoxia, fish kills, murky water, depletion of desirable flora and fauna, and a general reduction in biological integrity result. The increase in algae and turbidity increases the need to chlorinate drinking water, which in turn, leads to higher levels of disinfection byproducts. Increased disinfection is economically costly, and higher levels of disinfection byproducts may be carcinogenic. Excess nutrients can also stimulate the activity of microbes, such as *Pfisteria*, which may be harmful to human health.

In an effort to reduce water body impairment, strict guidelines are placed on the quality of effluent discharged from wastewater systems. Nitrogen and phosphorous levels, in particular, are heavily regulated to mitigate eutrophication.

Biological nutrient removal systems are therefore employed to remove nutrients from wastewater before it is discharged to the environment. These systems make use of microorganisms under varying environmental conditions to lower the total nitrogen and phosphorous levels in the wastewater. For example, some removal steps may take place in an aerobic, anaerobic, or anoxic environment. An aerobic environment is one which has oxygen present, whereas an anaerobic environment has little or no oxygen present. Anoxic environments are those which contain very little oxygen. In an anaerobic environment, for example, there is little or no free oxygen or bound oxygen. In an anoxic environment, there is little or no free oxygen available but there is a presence of bound oxygen.

Nitrogen removal, for example, generally involves the removal of a plurality of nitrogen compounds, including ammonia, nitrate, particulate organic nitrogen, and soluble organic nitrogen compounds from wastewater. Nitrogen removal is generally accomplished by a multistep process that involves nitrification followed by denitrification.

Nitrification is a microbial process whereby ammonia is sequentially oxidized to nitrite and then to nitrate. Nitrification is accomplished primarily by two groups of autotrophic bacteria. Autotrophic bacteria produce complex organic molecules by metabolizing lesser molecules. Autotrophic bacteria are used to metabolize ammonia and nitrite.

In the first step of nitrification, ammonia-oxidizing bacteria oxidize ammonia to nitrite in accordance with the equation:

$$NH_3 + O_2 \rightarrow NO_2^- + 3H^+ + 2e^-$$

Though *Nitrsomas* bacteria is the most frequently identified genus of bacteria involved with this step, *Nitrosoccus* and *Nitrosopira* bacteria may also be involved. The subgenera *Nitrsolobus* and *Nitrosovibrao* can also autotrophically oxidize ammonia. In the second step of nitrification, nitrite-oxidizing bacteria oxidize nitrite to nitrate in accordance with the equation:

$$NO_2^- + H_2O \rightarrow NO_3^- + 2H^+ + 2e^-$$

The most common genus associated with nitrite oxidation is *Nitrobacter*, though *Nitrospina*, *Nitrococcus*, and *Nitrospira* can also autotrophically oxidize nitrite. Nitrification generally takes place under aerobic conditions.

After ammonia-nitrogen undergoes nitrification, the nitrates undergo a process of denitrification by denitrifiers. Denitrifying bacteria reduce nitrate to gaseous nitrogen. Denitrifiers are generally heterotrophic bacteria that metabolize readily biodegradable substrates, such as nitrate or nitrite, under anoxic conditions. Denitrifying bacteria use nitrate as an electron receptor and carbon as an electron donor. Denitrification is carried out according to the following reactions:

Step 1:

$$6NO_3^- + 2CH_3OH \rightarrow NO_2^- + CO_2 + 4H_2O$$

Step 2:

$$6NO_2^- + 3CH_3OH \rightarrow 3N_2 + 3CO_2 + 3H_2O + 6OH^-$$

Overall:

$$6NO_3^- + 5CH_3OH \rightarrow 5CO_2 + 3N_2 + 7H_2O + 6OH^-$$

If oxygen is available, however, denitrifying bacteria will preferentially metabolize the oxygen before nitrate, rendering the denitrification process inefficient. Therefore, denitrification is desirably performed under conditions of low dissolved oxygen concentration for the denitrification process to perform adequately. Dissolved oxygen concentrations may be minimized during denitrification by avoiding over-aeration of the wastewater during nitrification, and avoiding aeration of the wastewater during denitrification, and/or by maintaining a high concentration of Biochemical Oxygen Demand (BOD) and/or total organic carbon (TOC) concentration in the wastewater such that existing microorganisms in the wastewater metabolize nearly all, if not all, available oxygen. A supplemental source of carbon, for example, methanol, is often added to the wastewater to increase BOD and TOC to facilitate efficient denitrification.

Traditional nitrification-denitrification systems thus involve multiple steps to remove nitrogen and often rely on the addition of a carbon source as an electron donor. Traditional nitrogen removal systems are often energy-intensive and require chemical additives.

Anaerobic ammonium oxidation (anammox) is a biological process in which ammonia and nitrite are simultaneously converted to nitrogen gas without the use of organic carbon. Anammox systems can thus achieve nitrogen removal in a single process. Anammox systems may result in significant savings when compared to conventional nitrification-denitrification processes. For example, anammox systems may achieve up to about a 60% reduction in energy associated with the removal of biological nitrogen. Anammox systems may also provide up to a 100% reduction in the use of carbon source, such as methanol. Bacterial species which may facilitate the anammox process in various embodiments include, but are not limited to *Kuenenia stuttgartiensis*, *B. anammoxidans*, *B. fulgida*, *B. sinica*, *A. propionicus*, *J. asiatica*, *S. brodae*, *S. sorokinii*, *S. wagneri*, and *S. profunda*.

The primary reactions that occur in an anammox system are the partial nitrification of ammonium and the anaerobic oxidation of ammonium:

Partial Nitrification:

$$NH_4^+ + 1.5O_2 \rightarrow NO_2^- + H_2O + 2H^+$$

Anammox $$NH_4^+ + NO_2^- \rightarrow N_2 + 2H_2O$$

Anammox systems have generally utilized separate reaction vessels to carry out the partial nitrification reaction and the anammox reaction. Furthermore, anammox has not previously been successfully incorporated into a main stream activated sludge process for the treatment of wastewater.

In accordance with aspects and embodiments, a wastewater treatment system is provided that incorporates an anammox process into a main stream activated sludge process. The disclosed devices, systems, and methods may select for, and control, the anammox process and may enhance the overall efficiency of an activated sludge process.

In accordance with embodiments, the disclosed anammox system eliminates the need for separate reactor vessels for the partial nitrification of ammonia and the anammox reaction. The anammox reaction may take place entirely within an aerated anoxic tank of an aerated anoxic activated sludge process. Aspects and embodiments disclosed herein may, for example, be incorporated into the Orbal®, BioNutre™, and VLR® aerated anoxic process systems offered by Evoqua Water Technologies LLC, or other aerated anoxic processes. Aspects and embodiments disclosed herein may, for example, be incorporated in the VARI-CANT® jet aeration systems offered by Evoqua Water Technologies LLC. The aerated anoxic systems contemplated by the present disclosure may include activated sludge systems or ballasted systems, for example, the BioMag® system offered by Evoqua Water Technologies LLC.

In some embodiments an aerated anoxic process includes a first stage aerated-anoxic reactor in which oxygen supply is limited, followed by an aerobic reactor. An aerated anoxic system may have a plurality of alternating aerated anoxic reactors and aerobic reactors positioned in series. The partial nitrification and anammox reactions may occur entirely within aerated anoxic treatment vessels. The anammox process may be carried out in biological flocs within the vessels, where little or no dissolved oxygen is present. The lack of a significant amount of dissolved oxygen in the aerated anoxic stage facilitates the partial nitrification of ammonia, followed by the anammox reaction, to achieve nitrogen removal.

In accordance with aspects and embodiments, the anammox systems, methods, and devices of the present disclosure may reduce the total energy cost associated with an activated sludge process. The energy cost of the activated sludge process may be reduced by up to about 60%. Furthermore, the anammox systems, methods, and devices of the present disclosure may reduce the total amount of chemicals used to facilitate treatment of a waste stream. For example, because ammonia is used as an electron donor, organic carbon may not need to be supplied to the system. In some embodiments, a 100% reduction in use of a supplemental carbon source may be achieved.

In accordance with embodiments, an anammox system may comprise a bacteria selection device. Anammox bacteria often presents as a more dense and granular bacteria than bulk activated sludge floc. Referring to FIG. 1, a bacteria selection device 10 may be provided in an aerated anoxic process 100 to select for and concentrate more dense, granular, bacteria, such as anammox bacteria. The bacteria selection device may be a fluidized tube, conduit, or column constructed to stratify heavier bacteria from the bulk activated sludge floc. Selection device 10 may have a "T" shape, conical shape, or any other suitable geometry that allows lighter, less dense, activated sludge floc to rise through the device, while more dense floc remains outside of, or in the lower portion of, the device. The selection device may be located in the aerated anoxic stage 110, and/or may, in some embodiments, be located in a downstream aerobic stage 120 of the aerated anoxic activated sludge process 100. In some embodiments, the device may be incorporated in a side stream reactor of a side stream anammox process. The selection device may operate at a flux of between about 0.05 gpm/ft$^2$ and about 30 gpm/ft$^2$.

In some embodiments, the selection device 10 is located submerged in liquid in a reactor vessel. An upper extent of the selection device may be located below a surface of liquid in the reactor vessel to provide for fluid to enter and/or exit the selection device 10 from both a lower end and an upper end. In other embodiments, the upper extent of the selection device may be located above a surface of liquid in the reactor vessel. A lower extent of the selection device may be located at a significant depth below the surface of liquid in the reactor vessel, for example, the selection device may extend 50% of more of a total distance from the surface of the liquid to a floor of the reactor vessel. In some embodiments, the lower extent of the selection device is located proximate the floor of the reaction vessel with just sufficient spacing to provide for flow of liquid in the reaction vessel into or out of the lower extent of the selection device to be unimpeded. In other embodiments, the lower extent of the selection device 10 may be directly or indirectly coupled to the floor of the reaction vessel and include one or more apertures to allow liquid in the reaction vessel to flow into or out of an internal volume of the selection device.

In some embodiments, bacteria selection device 10 may create a zone within the reactor that is less turbulent than the remainder of the reactor vessel. In some embodiments, this zone may be a quiescent zone. Different bacteria may behave differently in the quiescent zone created by selection device 10, and the quiescent zone created by selection device 10 may facilitate stratification and separation of different bacteria populations. Forms of bacteria, for example, anammox bacteria, may present as more dense than other forms of bacteria and may settle towards a lower portion of the selection device 10 while less dense bacteria may rise through the selection device 10. The less dense bacteria may be removed from the upper portion of the selection device 10, thus increasing the relative concentration of the anammox bacteria in the reactor.

Bacteria selection device 10 may further provide for lighter sludge floc to rise through the column and be wasted from the upper portion of the device as waste sludge 20. In accordance with embodiments, the device may be used in suspended growth biological processes with poor settling performance. The device may selectively waste out lighter activated sludge floc 20, including, but not limited to, pin floc and straggler floc with filamentous growth. Over time, the system will comprise a denser, more granular, suspended growth floc, which may improve the overall settling performance of the system.

In accordance with some embodiments, the bacteria selection device may reduce the sludge volume index (SVI) of the system. Embodiments of bacteria selection devices contemplated by the present disclosure may be used to achieve significantly lower SVIs, and in some examples, may achieve about a 20% improvement in SVI. In some embodiments, the improvement in SVI may be greater than about 20%, greater than about 50%, greater than about 75%, or more.

Figure 2:
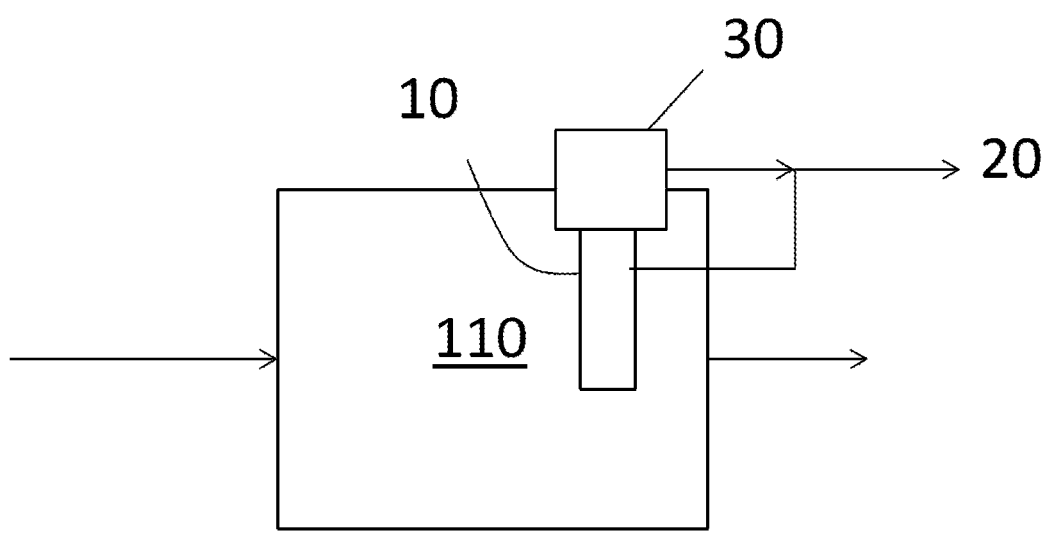
FIG. 2 is a diagram of a system comprising a surface wasting device in accordance with some aspects and embodiments.

In accordance with aspects and embodiments, a surface wasting device may be provided. The surface wasting device may advantageously waste undesirable species of bacteria from an activated sludge system and further concentrate more desirable species of bacteria. For example, in an anammox process, undesirable floc not containing anammox bacteria may collect on the surfaces of activated sludge basins. The surface wasting devices of the present disclosure may waste undesirable species collected on the surfaces of the activated sludge basins from the system to increase the concentration of anammox bacteria relative to the total bacteria population. The surface wasting device may be integral or separate from bacteria selection device 10. The surface wasting device may be any type of surface wasting device known in the art, and may be a fixed or floating surface wasting device configured to remove floating scum from the surface of the biological reactor. Referring to FIG. 2, surface wasting device 30 may be used in conjunction with bacteria selection device 10, and may waste out the undesirable floc/scum 20 at the surface of the selection device and aid in improving the overall settling ability of a suspended growth system. In various embodiments, the surface wasting device may include one or more of a weir, a skimmer, or embodiments of a surface wasting device as disclosed in PCT application No. PCT/US2013/031196, titled "SUFACE WASTING SYSTEM," filed Mar. 14, 2013, which is incorporated herein by reference in its entirety for all purposes.

In accordance with embodiments, a side stream reactor subsystem may be used in an anammox system as a seeding mechanism for feeding a reactor in a main biological treatment train with anammox bacteria. The side stream reactor subsystem may employ an activated sludge process on a stream having a higher concentration of ammonia than is present in the main stream. Anammox bacteria generally perform better in streams having higher ammonia-to-organic carbon ratios, and treatment of ammonia-rich side streams may cultivate anammox bacteria for seeding the main biological treatment train. The side stream reactor subsystem may include a sequencing batch reactor (SBR), a continuous flow biological reactor, or a combination of reactors. The reactors may be aerated or non-aerated, or may cycle between stages of aeration and non-aeration. A side stream reactor may reduce the time required for startup, buffer against system upsets, and enhance the overall stability of a main stream anammox process. The waste stream from the side stream reactor may be wasted to the main activated sludge stream, or may be wasted directly to solids handling.

In accordance with aspects and embodiments, one or more unit operations may be used in combination with a main stream treatment process. The main stream treatment process may include an aerated anoxic anammox process. For example, the aerated anoxic process may include any of a contact tank, a dissolved air flotation system, a primary clarifier, a secondary clarifier, a sludge dewatering process, an anaerobic digester, a side stream reactor, a side stream sequential batch reactor, and other suitable unit operations to facilitate the main stream anammox process. The process may additionally comprise a plurality of recycle streams.

Figure 3:
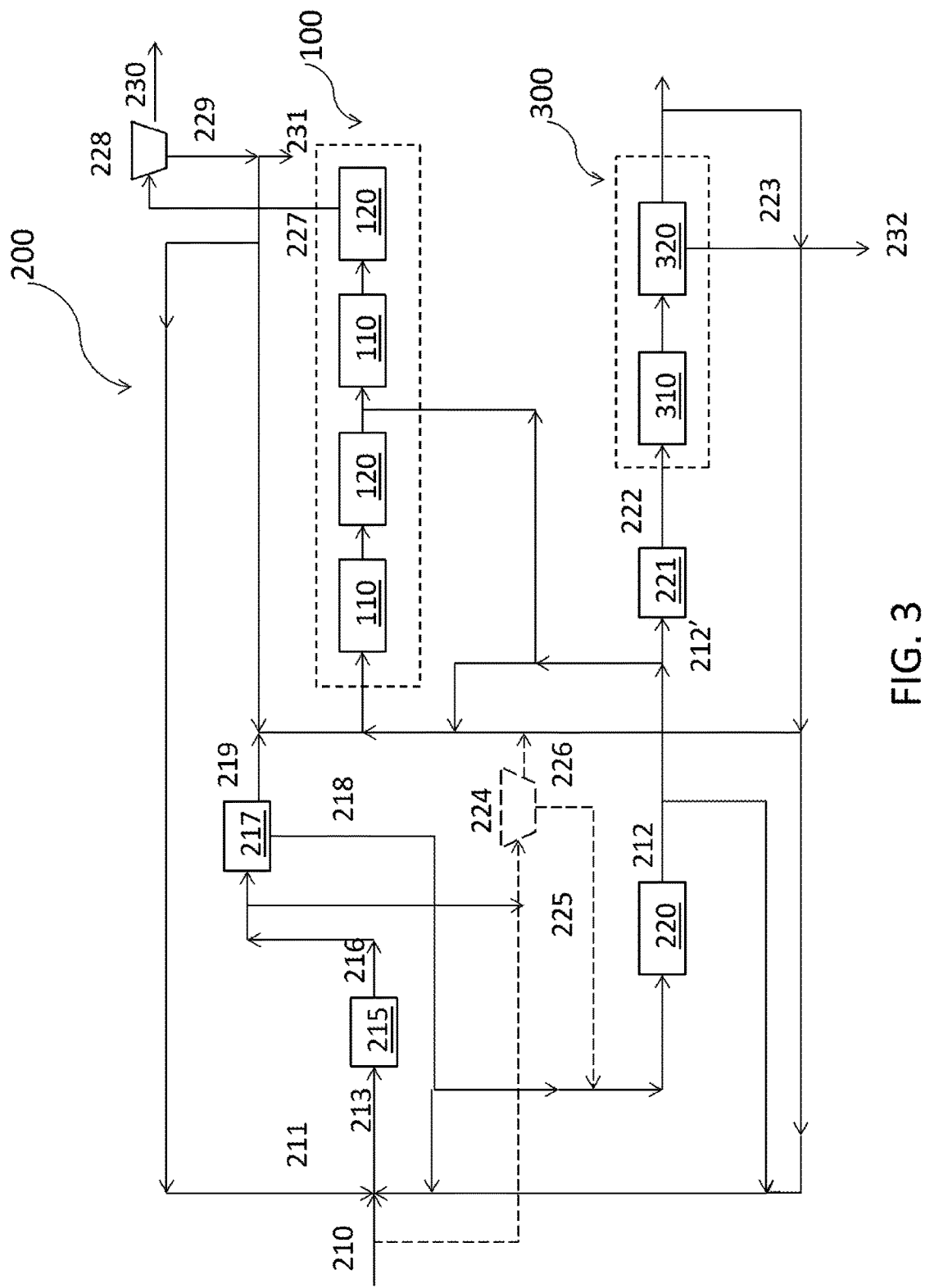
FIG. 3 is a flow diagram of an anammox system in accordance with some aspects and embodiments.

For example and referring to system 200 of FIG. 3, a solids-liquid separator, which may include a clarifier, a membrane separation system, and/or a dissolved air flotation separator system 217 may be combined with an anaerobic digester 220 to facilitate an aerated anoxic anammox process performed in a main treatment train 100 of treatment system 200. Influent wastewater 210 is mixed with return activated sludge 211 from an activated sludge process performed in main treatment train 100, in some embodiments, with recycled activated sludge 223 from side stream anammox process 300, and, in some embodiments, digested sludge 212 from anaerobic digester 220 to form mixed influent 213. The amount of return activated sludge 211, sludge 218 recycled from the dissolved air flotation system 217, and sludge recycled from activated sludge 223 and digested sludge 212 may be in a range of from about 0.5% to about 100% or more of the total volume of influent wastewater 210. The total volume and ratios of the volumes of the various recycle streams may be adjusted based on, for example, the types of contaminants, chemical or biological oxygen demand, total dissolved solids, and/or types of bacterial populations present in the influent wastewater.

Anammox bacteria typically tolerate anaerobic conditions better than other forms of bacteria which may be present in an activated sludge treatment system. Thus, anaerobic digester 220 may be used to increase a ratio of anammox bacteria to one or more other forms of bacteria in sludge processed in the anaerobic digester 220 to produce a digested sludge 212 rich in anammox bacteria, which may then be introduced into other unit operations of the treatment system 200. In some embodiments, the solids retention time of anaerobic digester 220 may be in the range of from about 5 days to about 100 days. The anaerobic digester 220 may also be utilized to reduce an amount of organic carbon in sludge processed in the anaerobic digester 220 prior to directing the digested sludge 212 into the main treatment train 100 of the treatment system 200. The organic carbon content of the sludge processed in the anaerobic digester 220 may be reduced by converting carbon into biogas, which, in some embodiments, is collected from the anaerobic digester 220 and used for fuel to produce electricity to offset the energy consumption of the wastewater treatment system. The anaerobic digester may reduce the amount of organic carbon in sludge processed in the anaerobic digester by between about 25% and about 75%. The reduction in organic carbon in the digested sludge introduced into the main treatment train 100 may provide anammox bacteria in the main treatment train 100 with a survival and/or growth advantage relative to other forms of bacteria which may require organic carbon as an energy source for cell maintenance and synthesis. Introduction of digested sludge 212 from the anaerobic digester 220 into the main treatment train 100 may thus increase a total quantity and/or a ratio of anammox bacteria to one or more other forms of bacteria in the main treatment train 100 relative to the total quantity and/or ratio of anammox bacteria to the one or more other forms of bacteria which would be observed in the absence of introducing the digested sludge 212 from the anaerobic digester 220 in to the main treatment train 100.

In operation, mixed influent 213 is directed to contact tank 215. Contact tank 215 may be aerated or unaerated. The sludge in contact tank 215 biosorbs soluble and colloidal contaminants, referred to herein as biological oxygen demand (BOD) present in the mixed influent 213. The residence time of the wastewater in the contact tank may be sufficient for the majority of the soluble and colloidal contaminants to be absorbed or adsorbed by the activated sludge in the contact tank. The residence time of the wastewater in the contact tank in some embodiments may be from about 30 minutes to about two hours, and in some embodiments, from about 45 minutes to about one hour. The residence time may be adjusted depending upon a variety of factors, including the BOD of the influent wastewater. A wastewater with a higher BOD may require longer treatment in the contact tank 110 than wastewater with a lower BOD. In some embodiments, at least a portion of the BOD of the influent wastewater may be oxidized in the contact tank. The oxidation of the BOD in the contact tank may be facilitated by bacteria included in the various recycle streams, for example, recycle streams 211, 212, and/or 218 provided to the contact tank. The amount of BOD oxidized in the contact tank may range from about 5% to about 50% of the total BOD of the wastewater influent to the contact tank.

Mixed liquor 216 leaves contact tank 215 from a contact tank outlet and is directed to an inlet of dissolved air flotation system 217. Dissolved air flotation system 217 comprises a dissolved air flotation tank in communication with a source of gas bubbles or a fluid including dissolved gas (not shown). In some embodiments, dissolved gas may be introduced into the mixed liquor 216 prior to the mixed liquor entering the dissolved air flotation system 217. Dissolved air flotation system 217 rapidly separates solids from liquid in mixed liquor 216. In some embodiments, about 60% of the suspended solids in the first mixed liquor introduced into DAF system 217 are separated from a solids lean effluent and about 40% of the BOD is removed. The suspended solids exit the DAF system 217 as solids-rich sludge stream 218. Removal of the BOD may include enmeshment and adsorption in the first mixed liquor and/or oxidation of the BOD and the formation of reaction products such as carbon dioxide and water. In other embodiments, up to about 100% of the suspended solids are separated from a solids lean effluent in the DAF system 217 and up to about 80% of the BOD is removed.

Contact tank 215 and DAF system 217 may reduce the organic carbon to nitrogen levels in the wastewater entering the main stream treatment train 100 by, for example, oxidation of BOD in the contact tank 215 and removal of organic compounds from the mixed liquor 216 in DAF system 217. The reduced organic carbon levels may facilitate the anammox reaction in the main stream treatment train 100. Lower C:N ratios may facilitate the anammox process by disfavoring organisms that rely on carbon as an energy source. For example, in some embodiments, the organic carbon to nitrogen ratio (C:N) of wastewater entering the main stream treatment train may be less than about 5:1, less than about 4:1, or less than about 3:1.

At least a portion of a solids-rich stream 218 including solids separated from the mixed liquor 216 in the dissolved air flotation system 217 is directed to anaerobic digester 220 to produce anaerobic digested sludge 212. A second portion of the solids-rich stream 218 may be recycled back to the contact tank 215 to provide the contact tank with an increased solids concentration to facilitate improved sorption of contaminants from the mixed influent 213, as described in U.S. patent application Ser. No. 14/268,907, filed May 2, 2014, titled "ENHANCED BIOSORPTION OF WASTEWATER ORGANICS USING DISSOLVED AIR FLOTATION WITH SOLIDS RECYCLE," which is incorporated herein by reference in its entirety for all purposes. The amount of activated sludge which is recycled back to contact tank 215 may be an amount equal to or greater than an amount required to maintain a desired population of bacteria in contact tank 215 to perform biosorption and/or oxidation of COD and/or BOD in contact tank 215 at a desired rate.

At least a portion of anaerobically digested sludge 212 produced in anaerobic digester 220 may be mixed with influent wastewater 210, recycled back to contact tank 215, or directed to main treatment train 100, which may be comprised of staged aerated anoxic reactors 110 and aerobic reactors 120. In some embodiments, not shown, the reactors may be staged anaerobic, anoxic, and aerated anoxic reactors, or any combination thereof. In some embodiments, between about 0% and 100% of anaerobically digested sludge 212 is recycled from one or more outlets of anaerobic digester 220 to one more other unit operations of the treatment system. The portion of the anaerobically digested sludge 212 may comprise from about 0% to about 100% of all the anaerobically digested sludge produced in the digester 220. Portion 212 may be directed from an outlet of anaerobic digester 220 to an inlet of a first aerated anoxic reactor 110 of the main treatment train 100 and/or to an inlet of a second aerated anoxic reactor 110 of the main treatment train 100. A second portion of anaerobically digested sludge, 212', is sent to dewatering process 221. Supernatant 222 from the dewatering process is then sent to side-stream anammox process 300. The ratios of anaerobically digested sludge directed to the inlet of the main treatment train 100, the side-stream anammox process 300, and recycled to contact tank 215 are selected and adjusted as needed to provide for the various systems to operate in a desired regime. For example, ratios of anaerobically digested sludge directed to the various other systems may be selected or adjusted to provide a desired C:N ratio in mixed liquor in the aerated anoxic reactor 110, to provide sufficient activated sludge in the contact tank 215 to adsorb and/or oxidize a desired amount of BOD and/or COD in the influent wastewater, and/or to provide for the side-stream anammox process 300 to produce a desired quantity of anammox bacteria to be introduced into the main treatment train 100.

Side stream anammox process 300 may have side stream reactor 310 and/or side stream sequencing batch reactor 320. A suspended growth process may be carried out in at least one of the side stream reactors. The reactors may be non-aerated, or aerated, or cycle between stages of aeration and non-aeration. The solids retention time (SRT) in the side stream process may be from about 3 days to about 50 days. The cultured biomass 223 from side stream anammox process 300 may be recycled into the system and used to bio-augment main treatment train 100 with anammox bacteria, may be recycled into influent 210, or both. The effluent from side stream process 300 may also be recycled to various points within the system. Waste sludge 232 may also exit the system for disposal or further treatment. Solids lean effluent 219 from dissolved air flotation system 217, which has a lower solids content than the solids rich stream 218, is directed into main treatment train 100, for example, into a first aerated anoxic reactor 110 of the main treatment train along with portion 212 of anaerobically digested sludge.

In some embodiments, a portion of influent wastewater 210 and/or a portion of contact tank mixed liquor 216 are directed into a separator, which may include, for example, a dissolved air flotation system, a membrane separation system, or a primary clarifier 224 without passing through the contact tank 215 or the dissolved air flotation system 217, respectively. A solids-rich stream 225 including settled solids separated from the wastewater 210 and/or contact tank mixed liquor 216 in primary clarifier 224 may be directed to anaerobic digester 220. Solids-lean effluent 226 from the primarily clarifier 224 may be directed, for example, to main treatment train 100.

Mixed liquor 227 produced in the main treatment train 100 is directed to secondary clarifier 228. A solids-rich sludge 229 separated from the mixed liquor 227 in the secondary clarifier 228 is recycled to various portions of the system. For example, a first portion of the solids-rich sludge 229 may be recycled to the contact tank 215 to provide solids for biosorption of contaminants from the mixed influent 213 in contact tank 215. The first portion of solids-rich sludge 229 may be anywhere from about 2% to about 40% of the total amount of solids-rich sludge 229 from clarifier 228. A second portion of the solids-rich sludge 229 may be recycled to the main treatment train 100. The second portion of solids-rich sludge 229 recycled to the main treatment train 100 may be from about 2% to about 40% of the total amount of solids-rich sludge 229 from clarifier 228. A solids-lean effluent 230 having a lower solids concentration than the solids-rich sludge 229 is separated from the mixed liquor 227 in the secondary clarifier 228. Waste sludge 231 may also exit the system from an outlet of clarifier 228 for further treatment or disposal. In some embodiments, the solids-lean effluent 230 has levels of nitrogen and/or other contaminants that meet standards for discharge to the environment. For example, in some embodiments, influent 210 may be domestic waste water or industrial waste water. Influent 210 may have a total nitrogen concentration of up to about 200 mg/L or more. Final effluent 230 may have less than about 50 mg/l total nitrogen, less than about 30 mg/L total nitrogen, or less than about 10 mg/L total nitrogen.

In some embodiments, phosphorous is removed from the wastewater 210 prior to discharge. Total phosphorous comprises soluble and particulate phosphorus. Particulate phosphorus can be removed from wastewater through solids removal. To achieve low effluent concentrations of phosphorous, however, it may be desirable that the soluble fraction of phosphorus also be targeted. Soluble phosphorous can be removed by chemical precipitation or adsorption aided by supplemental chemicals, or through microbial uptake, and may exit the system as waste sludge.

Proper operation and control of biological nutrient removal systems facilitates the production of low total nitrogen and total phosphorus effluent concentrations. Efficient operation may be informed by understanding of how temperature, dissolved oxygen levels, pH, filamentous growth, and recycle loads impact system performance.

Biological nitrogen removal reaction rates are temperature dependent. Nitrification and denitrification rates increase as temperature increases, until a maximum temperature is reached. In general, nitrification rates double for about every 8° C. to 10° C. rise in temperature. The effect of temperature on biological phosphorus removal is not completely understood, although rates usually slow at temperatures above about 30° C.

Dissolved oxygen must be present in the aerobic zone for phosphorus uptake to occur. Dissolved oxygen concentrations of about 1 mg/L are sufficient. Over-aeration, however, is undesirable and can lead to secondary release of phosphorus, high dissolved oxygen levels in the internal mixed liquor recycle which may reduce total phosphorous and total nitrogen removal rates, and increased operation and maintenance costs. Dissolved oxygen levels may be monitored and controlled by using oxidation reduction potential (ORP) measurements taken from ORP sensors, combined with aeration.

There is evidence that both nitrification and phosphorus removal rates decrease when pH levels drop below about 6.9. In some embodiments, a desirable pH range for nitrogen and phosphorous removal is from about 7.5 to about 8.6. Nitrification results in the consumption of alkaline material. In general, about 7.1 grams of alkalinity as $CaCO_3$ is consumed to oxidize 1 gram of ammonia. As alkalinity is consumed, pH decreases. Thus, treatment plants with low influent alkalinity may have reduced nitrification rates. Glycogen-accumulating organisms may also compete with Phosphate Accumulating Organisms at pH values less than 7 and temperatures greater than 30° C.

Filamentous growth can cause poor settling of particulate nitrogen and phosphorus in final clarifiers. However, many conditions necessary to achieve good biological nutrient removal, such as low dissolved oxygen, longer solids retention times, and good mixing, also promote filament growth. Therefore, it may be beneficial to identify the dominate filaments present in the system to design operation strategies to target their removal. For example, chlorinating recycle streams and chemical polishing steps may facilitate filament removal while also maintaining sufficient nutrient removal.

In accordance with embodiments, the aerated anoxic system may comprise a control system having a controller. The controller may utilize various analytical measurements, to control aeration input to manage the reactor environment. The control system may utilize at least one of a plurality of system parameters, including but not limited to dissolved oxygen concentration, oxidation reduction potential, nitrate concentration, nitrite concentration, and ammonia concentration to control the aeration input into the aerated anoxic reactor. By controlling aeration in response to selected system parameters, the anammox reaction can be optimized.

In some embodiments, the control system provides an analysis of the nitrogen forms and concentrations present in the reactor, which may enable control of the partial nitrification reactions and facilitate the anammox reaction. Monitoring dissolved oxygen and oxidation reduction potential may further facilitate setting the proper reaction conditions to favor the anammox mechanism. The systems disclosed in International Application No. PCT/US2012/065524, filed Nov. 16, 2012, and titled "USING CONTINUOUS NITRATE MEASUREMENT TO CONTROL AERATION IN AN AERATED-ANOXIC PROCESS," may be incorporated into the control system of the present disclosure, and the application is hereby incorporated by reference in its entirety for all purposes.

The control system may be implemented using one or more computer systems which may be, for example, a general-purpose computer such as those based on an Intel PENTIUM® or Core® processor, a Motorola PowerPC® processor, a Hewlett-Packard PA-RISC® processor, a Sun UltraSPARC® processor, or any other type of processor or combination thereof. Alternatively, the computer system may include specially-programmed, special-purpose hardware, for example, an application-specific integrated circuit (ASIC) or controllers intended for water treatment systems.

The computer system can include one or more processors typically connected to one or more memory devices, which can comprise, for example, any one or more of a disk drive memory, a flash memory device, a RAM memory device, or other device for storing data. The memory may be used for storing programs and data during operation of the system. For example, the memory may be used for storing historical data relating to the parameters over a period of time, as well as operating data. Software, including programming code that implements embodiments of the invention, can be stored on a computer readable and/or writeable nonvolatile recording medium, and then copied into memory wherein it can then be executed by one or more processors. Such programming code may be written in any of a plurality of programming languages, for example, Java, Visual Basic, C, C#, or C++, Fortran, Pascal, Eiffel, Basic, or any of a variety of combinations thereof.

Components of the computer system may be coupled by one or more interconnection mechanisms, which may include one or more busses, for example, between components that are integrated within a same device, and/or a network, and/or between components that reside on separate discrete devices. The interconnection mechanism may enable communication of, for example, data and/or instructions, to be exchanged between components of the system. The computer system can also include one or more input devices, for example, a keyboard, mouse, trackball, microphone, touch screen, and other man-machine interface devices as well as one or more output devices, for example, a printing device, display screen, or speaker. In addition, the computer system may contain one or more interfaces that can connect the computer system to a communication network, in addition or as an alternative to the network that may be formed by one or more of the components of the system.

According to one or more embodiments, the one or more input devices may include sensors for measuring any one or more parameters of any of the embodiments of systems disclosed herein and/or components thereof. Alternatively, the sensors, metering valves and/or pumps, or all of these components may be connected to a communication network that is operatively coupled to the computer system. Any one or more of the above may be coupled to another computer system or component to communicate with the computer system over one or more communication networks. Such a configuration permits any sensor or signal-generating device to be located at a significant distance from the computer system and/or allow any sensor to be located at a significant distance from any subsystem and/or the controller, while still providing data there between. Such communication mechanisms may be affected by utilizing any suitable technique including but not limited to those utilizing wireless protocols.

The controller can include one or more computer storage media such as readable and/or writeable nonvolatile recording medium in which signals can be stored that define a program to be executed by one or more processors. The medium may, for example, be a disk or flash memory. In typical operation, the one or more processors can cause data, such as code that implements one or more embodiments of the invention, to be read from the storage medium into a memory that allows for faster access to the information by the one or more processors than does medium.

The systems, methods, and devices of the present disclosure may be primarily applied to applications that have low biological oxygen demand to nitrogen (BOD/N) ratios. The systems, methods, and devices of the present disclosure may also be applied to high strength ammonia side streams and industrial wastes. The processes described could also be used with a biosoprtion process, such as the process disclosed in U.S. Pat. No. 8,623,213 titled "HYBRID AEROBIC AND ANAEROBIC WASTEWATER AND SLUDGE STREATMENT SYSTEMS AND METHODS," which is hereby incorporated by reference in its entirety for all purposes. In a biosoprtion process, a much larger portion of influent BOD is directed to an anaerobic digester and is unavailable as a carbon source for denitrification, resulting in a low carbon to nitrogen ratio in the wastewater directed to the activated sludge system. In addition, much of the influent total nitrogen normally removed with waste sludge is returned by the digester recycle and dewatering process, or with the anaerobic digester recycle, which further impacts the C:N ratio. The use of the systems, methods and devices of the present disclosure may expand the field of use for biosoprtion systems and methods. Biosoprtion may advantageously reduce the amount of carbon present in influent wastewater and facilitate the anammox reaction by ensuring competing, carbon-dependent, reactions do not occur.

It is to be appreciated that embodiments of the systems, methods and devices discussed herein are not limited in application to the details of construction and the arrangement of the apparatus components and system operations as set forth in the above description or illustrated in the accompanying drawings. The apparatus modifications, systems and methods are capable of implementation in other embodiments and of being practiced or of being carried out in various ways. Examples of specific implementations are provided herein for illustrative purposes only and are not intended to be limiting. In particular, systems, apparatuses and features discussed in connection with any one or more embodiments are not intended to be excluded from a similar role in any other embodiment.

Also, the phraseology and terminology used herein is for the purpose of description and should not be regarded as limiting. Any references to embodiments or elements or acts of the apparatus and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. Any references to positional or spatial orientation are intended for convenience of description, not to limit the present apparatus and methods or their components.

Having described above several aspects of at least one embodiment, it is to be appreciated that various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only.

What is claimed is:

1. A wastewater treatment system comprising:
an inlet configured to receive influent wastewater having an initial concentration of total nitrogen;
a main biological treatment train including at least one first unit operation configured to perform an anaerobic ammonium oxidation process in indirect fluid communication downstream of the inlet; and
at least one subsystem configured to increase a concentration of anammox bacteria in the at least one first unit operation, the at least one subsystem including:
a bacteria selection device constructed and arranged to separate anammox bacteria from at least one second bacteria, the bacteria selection device including a stratification column configured to stratify anammox bacteria from the at least one second bacteria, the stratification column being disposed in a biological treatment vessel of the main biological treatment train; and
a surface wasting device configured to waste the at least one second bacteria from the system,
the wastewater treatment system configured to produce an effluent having a concentration of total nitrogen that is less than the initial concentration of total nitrogen.

2. A method of treating wastewater, the method comprising:
directing the wastewater into a contact tank to produce a first mixed liquor, the wastewater having an initial concentration of total nitrogen;
directing the first mixed liquor into a first separation system to produce a solids-rich sludge and a solids-lean effluent;
introducing the solids-lean effluent into a main biological treatment train containing anammox bacteria;
increasing a concentration of anammox bacteria in the main biological treatment train by:
separating anammox bacteria from at least one second bacteria in a bacteria selection device by stratifying the anammox bacteria from the at least one second bacteria in a stratification column disposed in a biological treatment vessel of the main biological treatment train; and
wasting the at least one second bacteria from the main biological treatment train;
treating the solids-lean effluent in the main biological treatment train to produce a second mixed liquor; and
directing the second mixed liquor into a second separation system to produce a second solids-rich sludge and a second solids-lean effluent, the second solids-lean effluent having a total nitrogen concentration that is less than the initial concentration of total nitrogen.

3. The method of claim 2, further comprising recycling a first portion of the second solids-rich sludge to the contact tank, and a second portion of the second solids-rich sludge to the main biological treatment train.

4. A wastewater treatment system comprising:
an inlet configured to receive influent wastewater having an initial concentration of total nitrogen;
a main biological treatment train including at least one first unit operation configured to perform an anaerobic ammonium oxidation process in indirect fluid communication downstream of the inlet; and
at least one subsystem configured to increase a concentration of anammox bacteria in the at least one first unit operation, the at least one subsystem including:
a first separator configured to separate a mixed liquor produced in a contact tank having an inlet fluidly connected to a source of the wastewater into a solids-lean portion and a solids rich portion and to direct the solids-rich portion into an inlet of an anaerobic digester having a digested sludge outlet in fluid communication with an inlet of the main biological treatment train; and
a conduit configured to direct a portion of a digested sludge produced in the anaerobic digester to a side stream reactor configured to grow anammox bacteria at a rate greater than at least one other bacterial species,
the wastewater treatment system configured to produce an effluent having a concentration of total nitrogen that is less than the initial concentration of total nitrogen.

5. The system of claim 4, further comprises a conduit configured to recycle a portion of a digested sludge produced in the anaerobic digester back to an inlet of the contact tank.

6. The system of claim 4, further comprising:
a first conduit configured to direct a first portion of a digested sludge produced in the anaerobic digester to an inlet of a first treatment vessel of the main biological treatment train which is upstream of all other treatment vessels in the main biological treatment train; and
a second conduit configured to direct a second portion of the digested sludge produced in the anaerobic digester to an inlet of a second treatment vessel of the main biological treatment train which is downstream of the first treatment vessel.

7. The system of claim 6, wherein at least one of the first treatment vessel and the second treatment vessel comprises an anoxic, aerated-anoxic, or anaerobic treatment vessel configured to perform the at least one first unit operation.

8. The system of claim 4, further including a second conduit configured to direct a first portion of anammox bacteria grown in the side stream reactor into the inlet of the main biological treatment train.

9. The system of claim 8, further including a third conduit configured to direct a second portion of anammox bacteria grown in the side stream reactor into an inlet of the contact tank.

10. A method of treating wastewater, the method comprising:
directing the wastewater into a contact tank to produce a first mixed liquor, the wastewater having an initial concentration of total nitrogen;
directing the first mixed liquor into a first separation system to produce a solids-rich sludge and a solids-lean effluent;
introducing the solids-lean effluent into a main biological treatment train containing anammox bacteria;
increasing a concentration of anammox bacteria in the main biological treatment train by:
anaerobically digesting the solids-rich sludge in an anaerobic digester to produce an anaerobically digested sludge;
introducing a first portion of the anaerobically digested sludge into the main biological treatment train;
directing a second portion of the anaerobically digested sludge into a side stream reactor configured to grow anammox bacteria at a rate greater than at least one other bacterial species; and
introducing anammox bacteria from the side stream reactor into the main biological treatment train;
treating the solids-lean effluent in the main biological treatment train to produce a second mixed liquor; and
directing the second mixed liquor into a second separation system to produce a second solids-rich sludge and a second solids-lean effluent, the second solids-lean effluent having a total nitrogen concentration that is less than the initial concentration of total nitrogen.

11. The method of claim 10, wherein introducing the first portion of the anaerobically digested sludge into the main biological treatment train comprises:
introducing a first amount of the first portion of the anaerobically digested sludge into an inlet of a first treatment vessel of the main biological treatment train which is upstream of all other treatment vessels in the main biological treatment train; and
introducing a second amount of the first portion of the anaerobically digested sludge into an inlet of a second treatment vessel of the main biological treatment train which is downstream of the first treatment vessel.

12. The method of claim 10, further comprising introducing anammox bacteria from the side stream reactor into the contact tank.

13. The method of claim 10, further comprising recycling a first portion of the second solids-rich sludge to the contact tank, and a second portion of the second solids-rich sludge to the main biological treatment train.

* * * * *